(12) United States Patent
French et al.

(10) Patent No.: US 11,933,249 B2
(45) Date of Patent: Mar. 19, 2024

(54) REUSABLE UPPER STAGE ROCKET WITH AEROSPIKE ENGINE

(71) Applicant: Blue Origin, LLC, Kent, WA (US)

(72) Inventors: James R. French, Laguna Woods, CA (US); Roger Eugene Ramsey, Seattle, WA (US); Adam Wuerl, Seattle, WA (US)

(73) Assignee: Blue Origin, LLC, Kent, WA (US)

(*) Notice: Subject to any disclaimer, the term of this patent is extended or adjusted under 35 U.S.C. 154(b) by 0 days.

(21) Appl. No.: 17/811,408

(22) Filed: Jul. 8, 2022

(65) Prior Publication Data

US 2023/0211900 A1    Jul. 6, 2023

Related U.S. Application Data

(60) Provisional application No. 63/266,274, filed on Dec. 30, 2021.

(51) Int. Cl.
| | | |
|---|---|---|
| *F02K 9/64* | (2006.01) | |
| *F02K 9/42* | (2006.01) | |
| *F02K 9/46* | (2006.01) | |
| *F02K 9/52* | (2006.01) | |

(Continued)

(52) U.S. Cl.
CPC .................. *F02K 9/64* (2013.01); *F02K 9/42* (2013.01); *F02K 9/46* (2013.01); *F02K 9/52* (2013.01); *F02K 9/97* (2013.01); *B64G 1/401* (2013.01); *B64G 1/402* (2013.01)

(58) Field of Classification Search
CPC ..... F02K 9/42; F02K 9/46; F02K 9/52; F02K 9/97; F02K 9/88; F02K 9/94; B64G 1/006; B64G 1/58; B64G 1/401; B64G 1/402

See application file for complete search history.

(56) References Cited

U.S. PATENT DOCUMENTS 3,112,612 A * 12/1963 Berman .................... F02K 9/62
                                                          60/228
3,131,537 A    5/1964 Thielman
(Continued)

FOREIGN PATENT DOCUMENTS

| EP | 3650358 A1 | 5/2020 |
|---|---|---|
| RU | 2610873 C2 | 2/2017 |
| WO | WO 2022/251763 | 12/2022 |

OTHER PUBLICATIONS

Karthikeyan, N et al., "Effect of Spike Truncation on the Acoustic Behavior of Annular Aerospike Nozzles," AIAA Journal 15(9): 2169-2183, dated Sep. 1, 2013.

(Continued)

*Primary Examiner* — William H Rodriguez
(74) *Attorney, Agent, or Firm* — Knobbe, Martens, Olson & Bear, LLP

(57) ABSTRACT

Systems and methods for a fully reusable upper stage for a multi-stage launch vehicle are provided. The reusable upper stage uses an aerospike engine for main propulsion and for vertical landing. A heat shield can include a plurality of scarfed nozzles embedded radially around a semi-spherical surface of the heat shield, wherein inboard surfaces of the plurality of scarfed nozzles collectively define an aerospike contour. The heat shield can be actively cooled to dissipate heat encountered during reentry of the upper stage.

19 Claims, 9 Drawing Sheets

(51) Int. Cl.
   *F02K 9/97* (2006.01)
   *B64G 1/40* (2006.01)

(56) References Cited

U.S. PATENT DOCUMENTS

| | | | | |
|---|---|---|---|---|
| 3,314,609 | A * | 4/1967 | Horgan | F02K 9/84 239/265.33 |
| 5,201,832 | A * | 4/1993 | Porter | B64G 1/62 244/171.1 |
| 6,036,144 | A | 3/2000 | Sisk | |
| 6,213,431 | B1 * | 4/2001 | Janeke | F02K 9/97 244/171.1 |
| 6,516,605 | B1 * | 2/2003 | Meholic | F02K 9/97 60/247 |
| 6,629,416 | B1 * | 10/2003 | Johnson | F02K 9/97 239/265.17 |
| 6,964,154 | B1 * | 11/2005 | Sackheim | F02K 9/97 60/770 |
| 6,974,111 | B2 | 12/2005 | Janeke | |
| 8,256,203 | B1 * | 9/2012 | Blackmon | F02K 7/18 60/767 |
| 8,776,494 | B2 | 7/2014 | Carpenter et al. | |
| 10,773,834 | B2 | 9/2020 | Mbamalu | |
| 2004/0079072 | A1 * | 4/2004 | Shumate | F02K 9/82 60/770 |
| 2005/0017132 | A1 * | 1/2005 | Janeke | B64G 1/40 244/171.1 |
| 2014/0026537 | A1 | 1/2014 | Ellers et al. | |
| 2016/0114879 | A1 | 4/2016 | Janeke | |
| 2017/0138310 | A1 * | 5/2017 | Villarreal | F02K 9/978 |
| 2019/0003423 | A1 * | 1/2019 | Pelfrey | F02K 9/62 |
| 2020/0049103 | A1 * | 2/2020 | Craddock | F02K 9/68 |
| 2021/0381469 | A1 * | 12/2021 | Lapsa | F02K 9/97 |
| 2023/0060108 | A1 * | 2/2023 | Craddock | B01J 35/0006 |

OTHER PUBLICATIONS

Rombus, Source: http://www.astronautix.com/r/rombus.html, dated Apr. 21, 2021.

Brosz, Thomas, Phoenix Single-stage-to-orbit Concept, Source: https://contest.techbriefs.com/2015/entries/aerospace-and-defense/6232, dated Jul. 1, 2015.

How to Design a Fully Reusable Multi-stage Launch Vehicle, Source: https://forum.kerbalspaceprogram.com/index.php?/topic/106475-how-to-design-a-fully-reusable-multi-stage-launch-vehicle/, dated May 1, 2015.

NASA SBIR 2020-II Solicitation, https://sbir.nasa.gov/SBIR/abstracts/20/sbir/phase2/SBIR-20-2Z7.04-5610.html, form generated May 13, 2021.

Fick et al., "Performance Aspects of Plug Cluster Nozzles", Journal of Spacecraft and Rockets, vol. 33, No. 94, Jul./Aug. 1996, pp. 507-512.

Griffin et al., *Space Vehicle Design*, AIAA, 1991.

Migdal et al., "An Experimental Evaluation of Plug Cluster Nozzles," AIAA Journal 2(7): 1325-1327, Jul. 1964.

Aero Engines 1961, Flight: Aircraft, Spacecraft, Missiles, Jul. 20, 1961, p. 94.

* cited by examiner

REUSABLE UPPER STAGE ROCKET WITH AEROSPIKE ENGINE

CROSS-REFERENCE TO RELATED APPLICATION

This application claims the benefit of U.S. Provisional Application No. 63/266,274, filed Dec. 30, 2021, which is hereby incorporated by reference in its entirety.

BACKGROUND

Field

The technology relates generally to reusable rockets, in particular to reusable upper stage rockets using an aerospike engine.

Description of the Related Art

Single use rockets increase the cost for access to space. Reusable rockets provide for multiple uses and thus reduce the cost. Typical reusable rockets for a multi-stage space launch system are for the lower (first) stage only. It is therefore desirable to have reusability of the upper stage(s) of the space launch system.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches to space launch systems by presenting features for reusability of the upper stage rocket.

Described herein are systems and devices for a fully reusable upper stage for a multi-stage launch vehicle. The upper stage uses an aerospike engine for main propulsion and for vertical landing. At least a portion of the aerospike engine may be integrated into a heat shield configured to dissipate heat encountered upon reentry of the upper stage rocket. At least a portion of the heat shield may be actively cooled.

In some configurations, a reusable upper stage for a multi-stage launch vehicle may include: a rocket body extending from a forward end to an aft end and defining a longitudinal axis; a heat shield at the aft end of the rocket body, the heat shield may be configured to spherically cap the aft end of the rocket body and dissipate heat encountered upon reentry of the upper stage into the atmosphere; the heat shield may include a plurality of scarfed nozzles arranged radially around the longitudinal axis of the rocket body, wherein at least an inboard portion of each scarfed nozzle defines at least a portion of an aerospike contour; and an aerospike engine located at the aft end of the rocket body, the aerospike engine may include: at least one powerpack configured to pump propellant at high pressure to a plurality of thruster modules, wherein at least a portion of each thruster module of the plurality of thruster modules is inset into a respective scarfed nozzle of the plurality of scarfed nozzles of the heat shield, the plurality of thruster modules configured to eject exhaust along at least the inboard portions of the scarfed nozzles defining portions of the aerospike contour.

The reusable upper stage may further include secondary fluid injectors configured to eject fluid that joins with the exhaust ejected by the plurality of thruster modules.

The secondary fluid injectors may be arranged radially within the heat shield.

The plurality of thruster modules may be configured to eject exhaust and the secondary fluid injectors may be configured to eject fluid to form an exhaust plume that is similar in geometry to the exhaust plume from a full-length plug nozzle.

The heat shield may be actively cooled.

The heat shield may include a cooling circuit configured to dissipate heat encountered during reentry of the upper stage.

In some configurations, a multi-stage launch vehicle having a reusable upper stage may include: a lower stage configured to launch the vehicle from ground; an upper stage configured to separate from the lower stage, the upper stage may include: a rocket body extending from a forward end to an aft end and defining a longitudinal axis; a heat shield at the aft end of the rocket body, the heat shield may include a semi-spherical surface configured to cap the aft end of the rocket body and dissipate heat encountered upon reentry of the upper stage into the atmosphere, the heat shield may include: a plurality of scarfed nozzles embedded radially around the semi-spherical surface of the heat shield, wherein inboard surfaces of the plurality of scarfed nozzles collectively define an aerospike contour; and an aerospike engine located at the aft end of the rocket body, the aerospike engine may include: at least one powerpack configured to pump propellant at high pressure to a plurality of thruster modules, wherein each thruster module of the plurality of thruster modules is inset into a respective scarfed nozzle of the plurality of scarfed nozzles of the heat shield, the plurality of thruster modules configured to eject exhaust along the aerospike contour collectively defined by inboard surfaces of the plurality of scarfed nozzles.

The upper stage may further include secondary fluid injectors configured to eject fluid that joins with the exhaust ejected by the plurality of thruster modules.

The secondary fluid injectors may be arranged radially within the heat shield.

The plurality of thruster modules may be configured to eject exhaust and the secondary fluid injectors may be configured to eject fluid to form an exhaust plume that is similar in geometry to the exhaust plume from a full-length plug nozzle.

The heat shield may be actively cooled.

The heat shield may include a cooling circuit configured to dissipate heat encountered during reentry of the upper stage.

In some configurations, a method of using an upper stage rocket may include: launching a multi-stage space vehicle from earth, the space vehicle may include: a lower stage may be configured to lift the space vehicle off ground; and a reusable upper stage may be configured to separate from the lower stage and to land vertically, the upper stage may include: a rocket body extending from a forward end to an aft end and defining a longitudinal axis; a heat shield at the aft end of the rocket body, the heat shield comprising a semi-spherical surface configured to cap the aft end of the rocket body and dissipate heat encountered upon reentry of the upper stage into the atmosphere, the heat shield may include: a plurality of scarfed nozzles embedded radially around the semi-spherical surface of the heat shield, wherein inboard surfaces of the plurality of scarfed nozzles collectively define an aerospike contour; and an aerospike engine located at the aft end of the rocket body, the aerospike engine comprising: at least one powerpack may be configured to pump propellant at high pressure to a plurality of thruster modules, wherein each thruster module of the plurality of thruster modules is inset into a respective scarfed nozzle of the plurality of scarfed nozzles of the heat shield, the plurality of thruster modules configured to eject exhaust along the aerospike contour collectively defined by inboard surfaces of the plurality of scarfed nozzles.

The method may include descending the upper stage in an aft-end down orientation after separation from the lower stage; and ejecting the exhaust from the plurality of thruster modules to slow descent of the upper stage.

The method may include actively cooling the heat shield during descent of the upper stage.

The method may include landing the upper stage vertically.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Figure 1A:
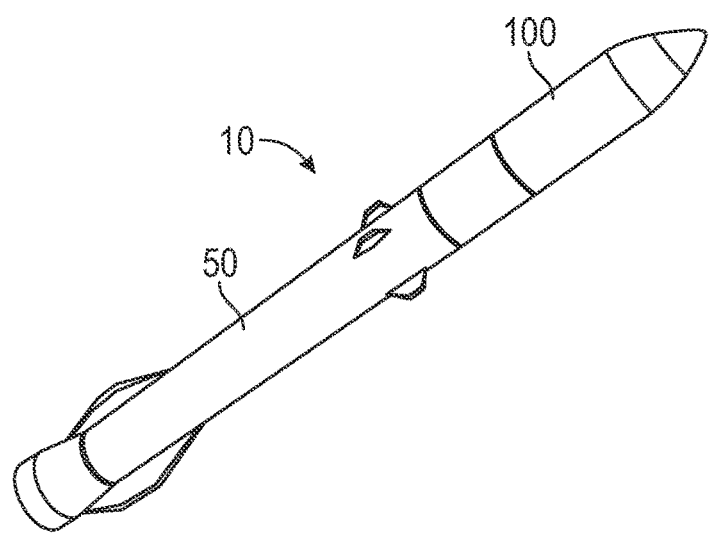
FIG. 1A is a perspective view of an embodiment of a multi-stage launch vehicle having a lower stage rocket, a reusable upper stage rocket with an aerospike engine with a heat shield, and a payload.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the present disclosure.

The technology relates to a fully reusable upper stage for a multi-stage launch vehicle. The upper stage uses an aerospike engine for main propulsion and reentry and landing. An actively-cooled plug of the aerospike engine is used as a heat shield to enable engine-first re-entry. The aerospike engine can include a plurality of structures configured to direct exhaust in a way that is similar to the way exhaust is directed by a truncated aerospike plug. The plurality of structures may be embedded in a semi-spherical surface or segment of a heat shield at the aft end of the upper stage rocket. Inboard surfaces of the plurality of structures can collectively form a contour that is similar to the contour of a continuous annular ramp or surface of a truncated aerospike plug. Each structure of the plurality of structures can direct exhaust ejected from one thruster of a plurality of thrusters through the heat shield. In one non-limiting example, the plurality of structures includes a plurality of scarfed nozzles formed in a semi-spherical surface or segment of the heat shield at the aft end of the upper stage rocket. Embodiments of the reusable upper stage rocket according to the present disclosure may use the aerospike engine to descend and land vertically upright.

The technology described herein has multiple advantages and addresses multiple problems associated with conventional approaches to reusing upper stage rockets. For example, the systems and methods address the problem of surviving the re-entry heating environment. A re-entry heating profile may be generated with a high heating rate but over a very short pulse. The system may re-enter engine-first at a low angle-of-attack, which generates a high ballistic coefficient. The aerospike nozzle according to embodiments of the present disclosure takes the brunt of the heating and is actively cooled to withstand high temperatures, which is feasible because the heating pulse is short.

Another problem addressed by this system is the high cost and large amount of time typically required to develop new rocket engines. Systems and methods described herein address this problem by, in some embodiments, repurposing turbomachinery (e.g., powerpacks) and thrust chambers designed for other engines. For example, the systems may use several powerpacks and/or dozens of thrust chambers designed for use in other space vehicles. Advantages of repurposing existing hardware include reducing the cost, schedule, and risk of a new engine development.

Advantageously, embodiments of the aerospike engine systems and methods described herein that use multiple powerpacks and/or thrust chambers have the ability to digitally throttle by shutting down powerpacks and/or nozzles, thereby eliminating the risk of a single engine point-of-failure during landing (as typical designs only land on the center engine, which is thus a single point of failure). As another example, it may be advantageous to power down some number of powerpacks and/or nozzles to meet thrust requirements for a first mission, while employing all or substantially all of the powerpacks and/or nozzles for a second mission. Accordingly, the ability to digitally shut down powerpacks and/or nozzles is particular advantageous in the context of the reusable systems and methods described herein.

Another example advantage of the aerospike engine systems and methods described herein is that the upper stage may stay in the "engine down" orientation for the entire re-entry profile. This eliminates the need to reorient the vehicle (e.g., from a high angle-of-attack) just prior to landing. Another example advantage of this approach is that because aerospike engines are altitude compensating (i.e., they have near-optimal performance at both sea-level and in vacuum), the same engine can be used for ascent-to-orbit, deceleration burns during re-entry, and for landing.

Another advantage of the aerospike engine systems and methods according to embodiments of the present disclosure is the ability to be tested at sea-level. Most vacuum-optimized engines require highly specialized vacuum test stands or are mostly tested without high expansion ratio nozzles.

Various example embodiments will now be described with respect to the figures. FIG. 1A is a perspective view of an embodiment of a multi-stage launch vehicle 10 having a lower (first) stage rocket 50 and a reusable upper stage rocket or upper stage 100. The upper stage 100 has an aerospike engine incorporating a heat shield and is carrying a payload, such as a spacecraft, as further described herein. The vehicle 10 may be used to launch the payload from the ground into space, and, in some examples, into orbit around earth or around other celestial bodies. The vehicle 10 may launch the payload to low earth orbit (LEO), geostationary orbit (GEO), or other orbits. The vehicle 10 may be used for suborbital flight. The vehicle 10 may use liquid, solid, and/or hybrid rockets.

The lower stage 50 may launch the vehicle 10 from the ground. Booster rockets may or may not be used for launch. After launch and at a desired altitude, the lower stage 50, and any boosters, may separate from the vehicle 10 and fall to earth or be controllably landed for reuse. The second or upper stage 100 may then propel the payload to a faster velocity and/or higher altitude. The upper stage 100 may then separate from the payload. The upper stage 100 is then controllably descended for landing and reuse in subsequent flights. The upper stage 100 uses the aerospike engine to propel the payload as well as to controllably descend and land, as further described herein.

Figure 1B:
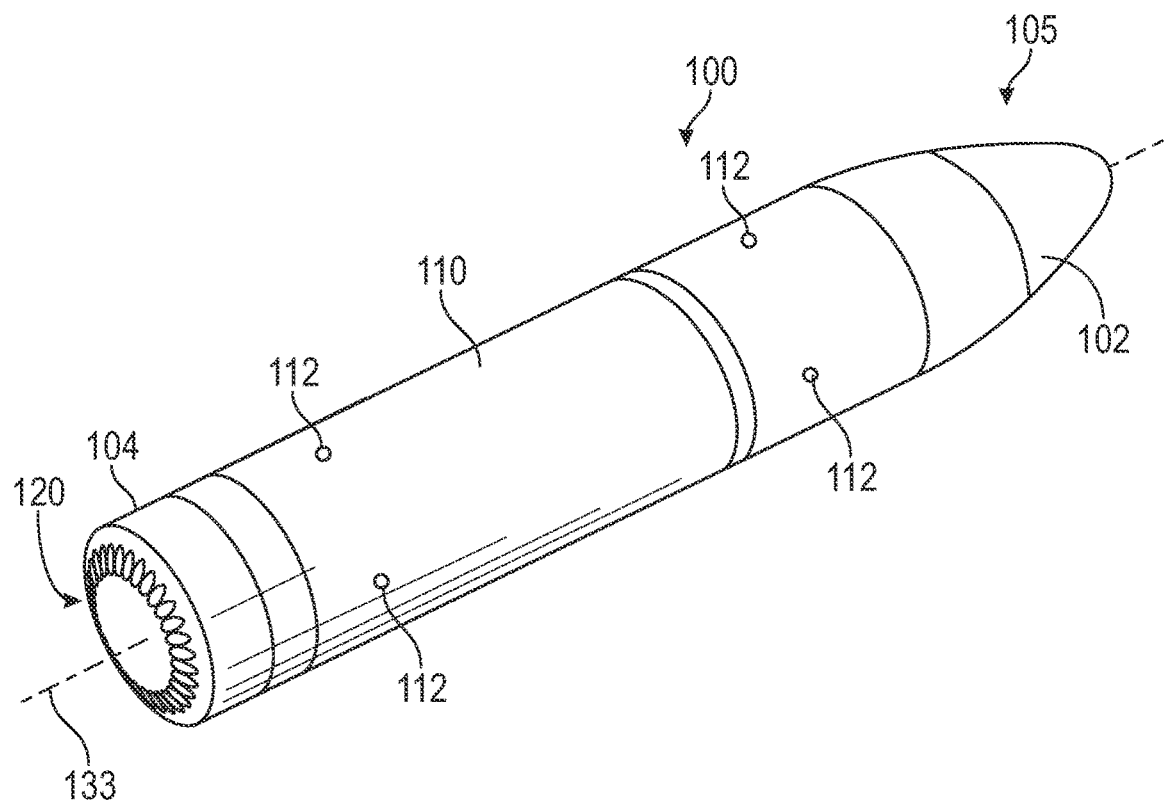
FIG. 1B is a perspective view of an embodiment of a reusable upper stage rocket having an aerospike engine with a heat shield according to the present disclosure, which may be used with the multi-stage launch vehicle of FIG. 1A.

FIG. 1B is a perspective view of an embodiment of the upper stage 100. The upper stage 100 has an aerospike engine 120 with a heat shield and is carrying a payload 105, such as a spacecraft or satellite. The upper stage extends from a forward end 102 to an aft end 104 and defines a longitudinal axis 133. The upper stage 100 includes a rocket body 110. The body 110 is an outer structure of the upper stage 100 that houses the fuel tank, the oxidizer tank, and other components. The upper stage 100 may include side thrusters 112 to orient the body 110 after separation from the payload 105 and during descent. The body 110 may have an outer diameter of about 23 feet, or it may be 15, 20, 25, 30 or fewer or greater feet in diameter. The body 100 is attached to or encloses a payload 105 located at the forward end 102. The aerospike engine 120, which may include the powerpacks (e.g., turbopumps), thrusters (which in turn include combustion chambers and injectors), an aerospike nozzle, valves and other components, is located at the aft end 104. The powerpacks provide propellants (fuel and oxidizer) to the thrusters. The upper stage 100 travels in the forward direction when being propelled by the lower stage and when propelling the payload into orbit. The upper stage 100 travels in the aft direction during reentry and when landing.

Figure 2:
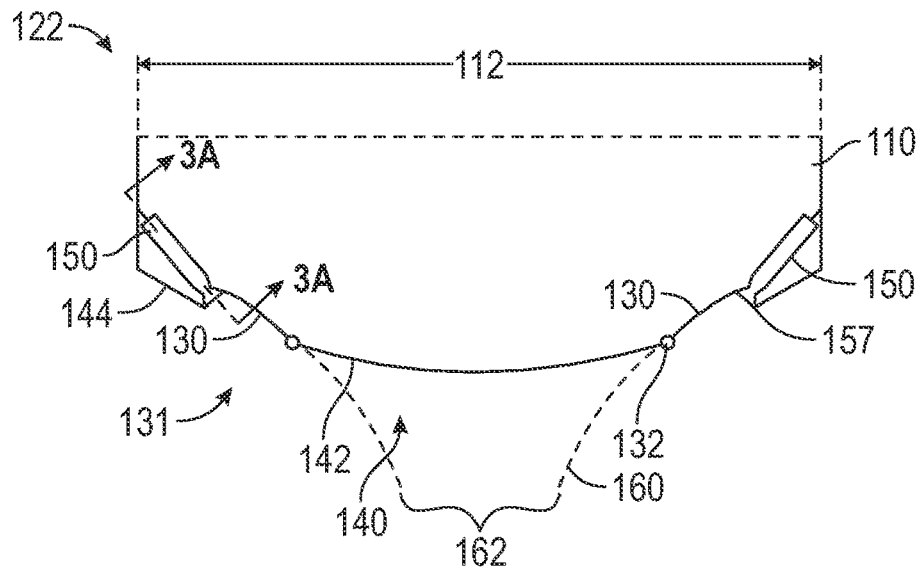
FIG. 2 is a cross-section view of an example truncated aerospike engine.

A traditional truncated aerospike engine is now described in order to illustrate certain distinguishing features of the aerospike engine 120 described above with reference to FIGS. 1A and 1B and described below with reference to FIGS. 4A, 4B, 4C, 4E, 4F, 4G, and 4H. With reference now to FIG. 2, a cross-section view of a traditional truncated aerospike engine 122 is provided. The aerospike engine 122 includes a continuous annular ramp or surface 130 forming a truncated aerospike. Gases emitted from the engine 122 are directed onto the continuous annular surface 130.

The aerospike engine 122 includes an aft end including portion 144. The engine 122 also includes a heat shield 140 located aft of the portion 144 and the continuous annular surface 130.

The aerospike engine 122 also includes a plurality of openings or pockets 131. The plurality of openings or pockets 131 may be arranged circumferentially around a longitudinal axis 133 of a rocket. The openings or pockets 131 direct exhaust from thrusters 150 onto the continuous annular surface 130. The continuous annular surface 130 may meet the heat shield at an aft end of the surface 130, for example at a point 132. The ejected exhaust may flow along the continuous annular surface 130 and join with fluid from secondary fluid injectors (not shown).

The combined flow from the ejected exhaust and secondary fluid may result in a plume 162. The plume 162 may have the general shape of an aerospike plug. The ejected exhaust may follow the continuous annular surface 130 and flow along a contour 160 to form the plume 162. Additional secondary fluid injectors located in the central portion 142 of the heat shield 140 may direct secondary fluid flow into the plume 162.

The continuous annular surface 130 may correspond to a shape of at least a portion of a truncated aerospike plug. The continuous annular surface 130 may therefore define a truncated plug having a longitudinal length that is a portion of a full aerospike plug that would extend to a terminal point if the surface 130 continued. For example, a continuous annular surface 130 may have a contour that, if extended, would have a shape that meets at a point. The contour may have a hypothetical shape of a full aerospike plug profile if the surface 130 continued. A longitudinal length of a full aerospike plug profile may be defined as D1. A longitudinal length of a truncated aerospike plug profile may be defined as D2. The continuous annular surface 130 may form such a truncated plug that is various different percentages of this hypothetical full length. The length D2 may be 5%, 10%, 15%, 20%, 25%, 30%, 35%, 40%, 45%, or 50% of the length D1 or a percentage greater or less than 5%-50%. In some embodiments, the length D2 is 11% of the length D1. The length D2 may be 50% or less, 45% or less, 40% or less, 35% or less, 30% or less, 25% or less, 20% or less, 15% or less, 10% or less, or 5% or less, of the length D1.

The continuous annular surface 130 may correspond to the shape of a tapered spike in the center of the engine, with the combustion chamber and throat distributed around the periphery via the thrusters 150 and firing inboard at an angle along the continuous annular surface 130. The exhaust stream from the thrusters 150 may impinge on the continuous annular surface 130 and be guided by the continuous annular surface 130 to follow the contour 160. The effective exit area of a spike nozzle may be equal to the cross-sectional area at which the exhaust gas impinges on the continuous annular surface 130. In some embodiments, the rocket body 110 is 23 feet in diameter, and the thrusters are arranged annularly such that a diameter for the impingement of the exhaust is about 21 feet. The annular arrangement allows the plume to expand into equilibrium with the ambient pressure so that, in effect, the expansion ratio is adjusted to the optimum value as the vehicle ascends. This continues until the ambient pressure becomes equal to that which corresponds to the expansion ratio as defined by the circumference of the engine compared to the throat area, after which it operates like any under-expanded engine as it ascends into vacuum.

Figure 3A:
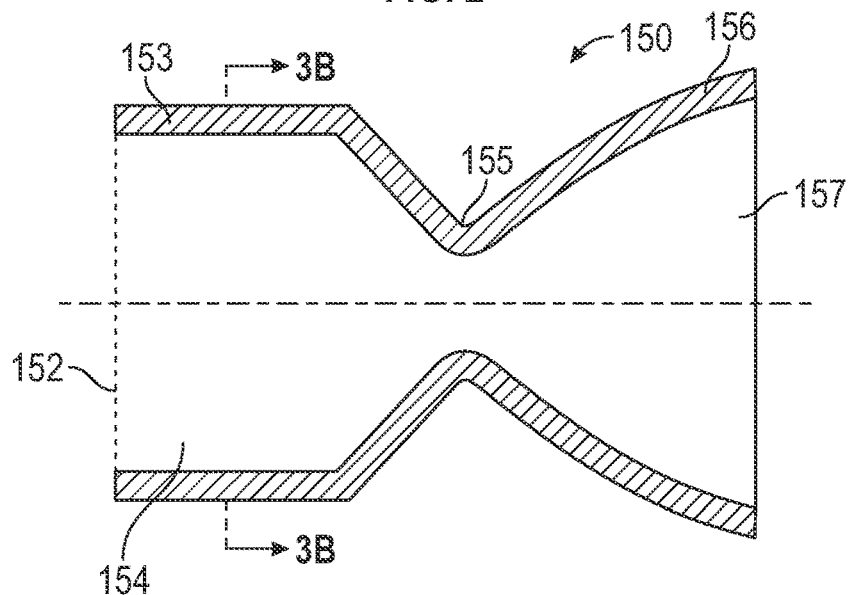
FIGS. 3A and 3B are longitudinal and transverse cross-section views, respectively, of an example thruster module of the truncated aerospike engine of FIG. 2.
Figure 3B:
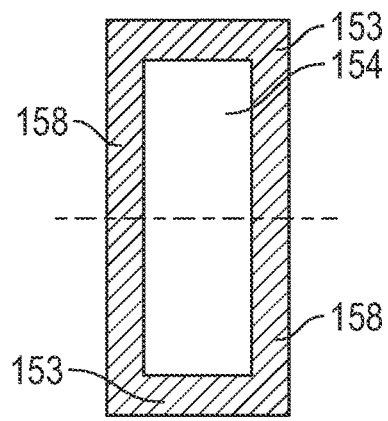

FIGS. 3A and 3B are cross-section views of an embodiment of the thruster module 150. FIG. 3A is a cross-sectional view as taken along the line 3A-3A as indicated in FIG. 2, and FIG. 3B is a cross-sectional view as taken along the line 3B-3B as indicated in FIG. 3A. The thruster 150 is a thruster concept that can be specifically designed to be used in a very tightly packed configuration in an aerospike engine. A different thruster configuration is shown in FIGS. 4A, 4B, 4C, 4E, 4F, 4G, and 4H. For example, a different thruster 450 is described below with reference to FIGS. 4A, 4B, 4C, 4E, 4F, 4G, and 4H.

The thruster 150 may extend from an inlet end 152 through which the propellants (fuel and oxidizer) coming from the powerpack(s) are introduced into the combustion chamber 154 where combustion of the propellants occurs. The hot gases created in the combustion process exit the combustion chamber through a converging nozzle (or throat section) 155 and a diverging nozzle 156 to an exit 157. The thruster 150 may include sidewalls 153, 158 forming the combustion chamber and nozzle. The combustion chamber 154 and nozzle 156 may have a flat profile, as shown in FIG. 3B. The sidewalls 153 and 158 may form sides of the thruster 150, with the upper and lower sidewalls 153 being shorter than the transverse sidewalls 158. The thruster 150 may be 1.5, 2.0, 3.5, 4.0 or more times taller than it is wide. The flat profile of the thruster 150 can allow for a greater density of thrusters 150 to be arranged circumferentially in the engine as compared to a circular cross-sectional thruster. In some embodiments, the throat section 155 of each thruster may have an area of about 0.6 square inches (in$^2$). In one non-limiting example, the area is about 0.645 square inches (in$^2$). The area of the throat section 155 for each thruster 150 may be from about 0.3-0.9, from about 0.4-0.8, or from about 0.5-0.7 square inches (in$^2$).

Figure 4A:
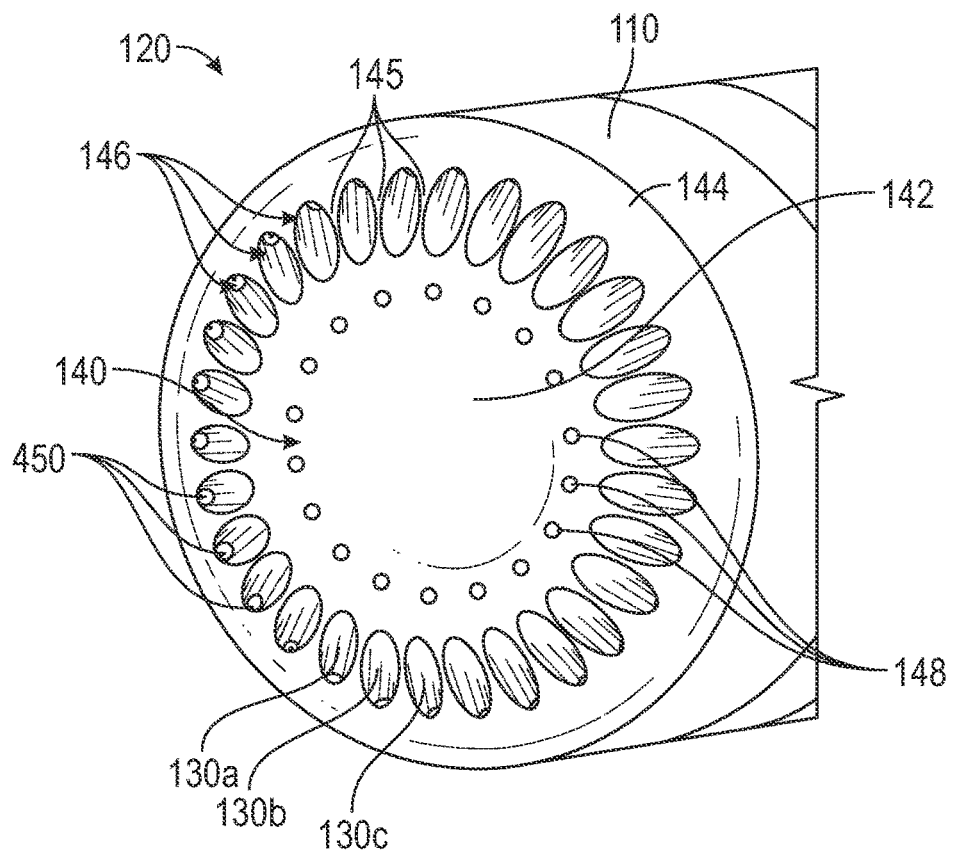
FIGS. 4A and 4B are partial perspective and side views, respectively, of the aerospike engine with a heat shield of FIG. 1B.
Figure 4B:
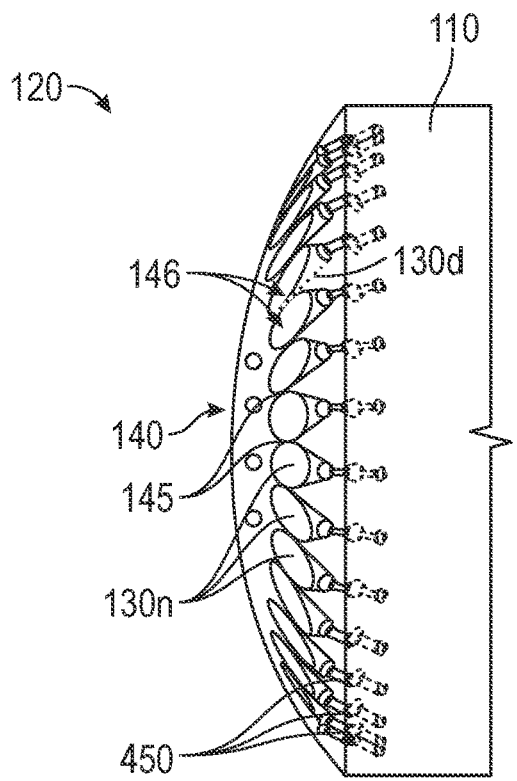
Figure 4C:
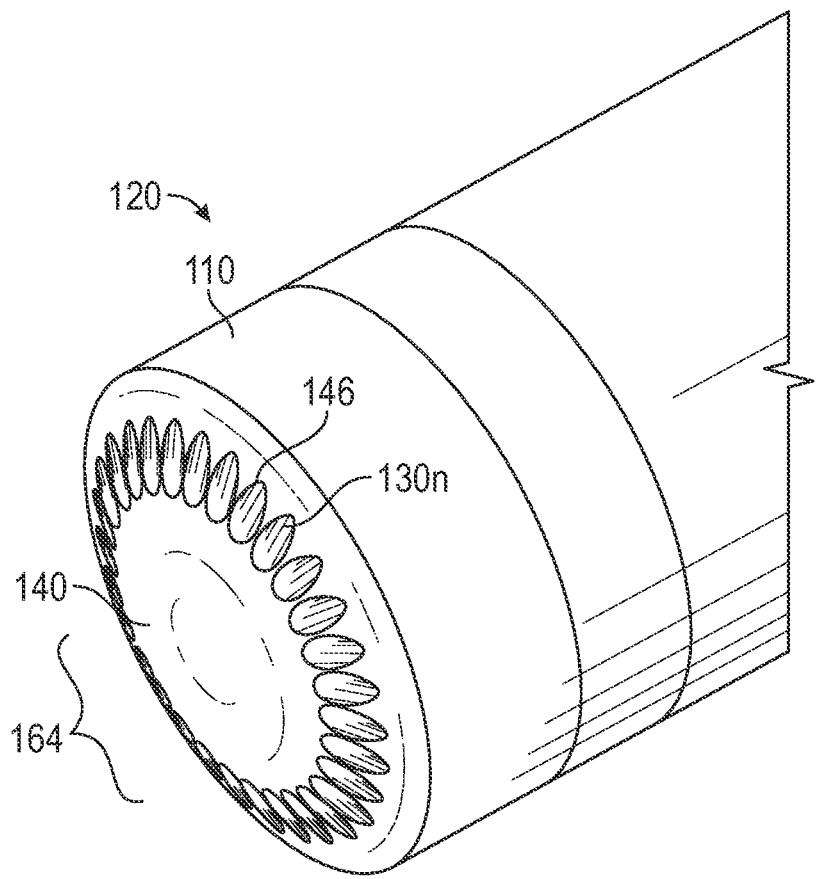
FIG. 4C illustrates another perspective view of the aerospike engine with a heat shield of FIG. 1B.
Figure 4D:
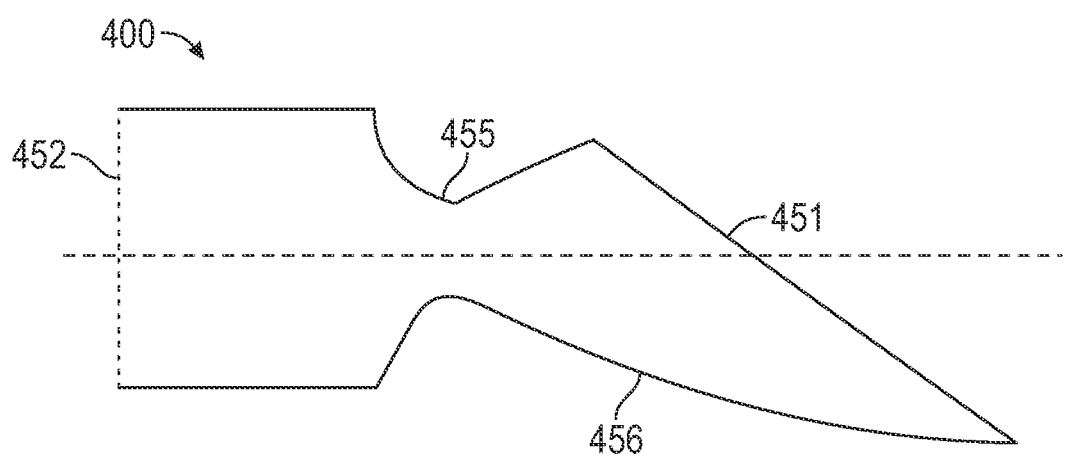
FIG. 4D illustrates a non-limiting example profile of a thruster having a scarfed nozzle that may be implemented in the system of FIGS. 4A-4C.

A different thruster configuration, similar to some conventional rocket thrust chambers, is illustrated in an example profile 400 of a thruster having a scarfed nozzle shown in FIG. 4D and thrusters 450 shown in FIGS. 4A, 4B, 4C, and FIGS. 4E-4H. The circular arrangement of thrusters 450, for example as shown in FIG. 4A, may form an overall exit area having a diameter. In some embodiments, the overall exit area may be from about 14-28 feet, from about 16-26 feet, from about 18-24 feet, or from about 20-22 feet in diameter. In one non-limiting example, the overall exit area is about 21 feet in diameter. In some embodiments, the expansion ratio for each thruster 450 may be from about 10-20, from about 12-18, from about 13-17, or from about 14-16. The thrusters 450 may provide an overall expansion ratio. In one non-limiting example, the overall expansion ratio is about 644. The overall expansion ratio may be from about 600-700, from about 620-680, from about 630-670, or from about 640-660. In some embodiments, each thruster 450 may be from about 1-3 inches, or from about 1.5-2.5 inches wide. In one non-limiting example, each thruster is about 2 inches wide. The wall thickness of each thruster 450 may be from about 0.2-0.8, from about 0.3-0.7, or from about 0.4-0.6 inches. In one non-limiting example, the wall thickness of each thruster 450 is about 0.5 inches. The thrusters 450 may provide performance characteristics that allow for controlled descent and vertical landing. In some embodiments, the specific impulse (Isp) for each thruster may be from about 395-425, from about 400-420, or from about 405-415 seconds. In one non-limiting example, the thrusters 450 are implemented in the aerospike engine 120 using two BE-3U powerpacks provided by Blue Origin® (Kent, Washington). Larger numbers of powerpacks may be used depending upon total thrust requirement.

FIGS. 4A and 4B are partial perspective and side views, respectively, of the aerospike engine 120 of FIG. 1B, according to the present disclosure. FIG. 4C illustrates another perspective view of the aerospike engine 120 of FIG. 1B. As described above, the aerospike engine 120 can be used with the multi-stage launch vehicle 10 of FIG. 1A.

The aerospike engine 120 may include a heat shield 140. The heat shield 140 dissipates heat during reentry. The heat shield 140 has a curvature. The heat shield 140 may have a semi-spherical shape. The heat shield 140 may be spherical with a radius from about 10 to 35 feet, from about 15 to 30 feet, from about 20 to 25 feet, or have a radius greater or smaller than those ranges. The heat shield may be formed of a cobalt-based wrought alloy such as but not limited to Haynes® 25, carbon-carbon, or niobium. The heat shield 140 may be constructed of thin face sheets separated by metal wool, or carbon foam, depending on the face sheet material. The turbine exhaust gas is fed directly into the space between the face sheets and exhausted into the space 164 (see FIG. 4C) inside the annular engine exhaust stream through orifices in the outer sheet.

The heat shield 140 includes a central portion 142. The central portion 142 may dissipate the majority of the heat encountered during reentry. The heat shield 140 can form a continuous semi-spherical surface or segment that is interrupted by a plurality of openings 146 and a plurality of injectors 148, described in detail below. The heat shield 140 may join the rocket body 110 at an outer portion 144 of the heat shield 140.

The heat shield 140 may be cooled. The upper stage 100 generates a re-entry heating profile with a high heating rate but over a very short period of time. The upper stage 100 may re-enter engine-first in the aft direction at a low angle-of-attack, which generates a high ballistic coefficient. The heat shield 140 takes the brunt of the heating and may be actively cooled to survive, which is feasible because the heating pulse is short. A cooling circuit may include flow channels extending within heat shield 140 to provide cooling. Coolant may be pumped within the heat shield 140 and ejected behind the entry shock during reentry for further protection. In some examples, the system may be pressure-fed such that coolant is passed through cooling channels in the shield and then deposited directly into the air flow behind the entry shock, so as to form a cooler boundary layer against the skin (or outer layer) of the shield 140. Alternatively, coolant can be deposited directly into the airstream behind the vehicle 10. In some embodiments, a regenerative cooling circuit can be implemented.

The engine 120 includes a plurality of thruster modules or thrusters 450. The thrusters 450 are in fluid communication with one or more turbopumps or powerpacks within the rocket body 110 via a manifold (not illustrated). The propellants (fuel and oxidizer) pumped to high pressure by the powerpacks can be routed through manifolds (not shown) to the multiple thrusters 450. The turbine drive gas used to drive the powerpacks flows directly to the aft heat shield where it is injected into the space 164 within the annular exhaust stream from the thruster cluster. In some embodiments, two, three, four, five or more powerpacks feed a single aerospike engine 120 to eject exhaust from the array of thrusters 450. For landing, in some embodiments using only one of two power packs, which provides redundancy, the sea level thrust may be reduced to about 100 klbf. Throttling the power pack to 20% may reduce thrust to about 20 klbf.

The thrusters 450 may be arranged in a circumferential pattern about the longitudinal axis of the rocket body 110. There may be thirty (30) thrusters 450. Each thruster 450 may be spaced evenly, for example subtending a 12° segment in a circular pattern. There may be fewer or more thrusters 450. For example, there may be twenty, forty, fifty, sixty, seventy, eighty, ninety, one hundred, one hundred and ten, one hundred and thirty, one hundred and forty, one hundred and fifty, about any of these numbers, or fewer or greater thrusters 450. In one non-limiting example, 120 thrusters are implemented. The thruster 450 can be spaced evenly, subtending a 3° segment in a circular pattern. For clarity, only some of the thrusters 450 are labelled in the figures. Generally, the thrusters 450 are pointed radially inwardly and in an aft direction. Each individual thruster 450 may provide about 2000 pound-force (lbf) in vacuum.

The aerospike engine 120 can include a plurality of structures configured to direct exhaust from the thrusters 450 in a way that is similar to the way exhaust is directed by a truncated aerospike plug, such as the truncated aerospike plug of FIG. 2. The plurality of structures may be embedded in the semi-spherical surface or segment of the heat shield 140. Inboard surfaces of the plurality of structures can collectively form a contour that is similar to the contour of a continuous annular ramp or surface of a truncated aerospike plug. Each structure of the plurality of structures can direct exhaust ejected from one thruster 450 of the plurality of thrusters 450 through the heat shield 140.

In one non-limiting embodiment, the plurality of structures include openings or pockets 146 through which exhaust from the thrusters 450 flows. The openings 146 can be cavities formed in or embedded within the semi-spherical surface of the heat shield 140. For clarity, only some of the openings 146 are labelled in the figures. The plurality of openings 146 are aligned with the thrusters 450. There may be one opening 146 for each thruster 450. The openings 146 are arranged at a radially outer portion of the heat shield 140. The openings 146 are arranged in a circumferential pattern.

Each of the plurality of openings 146 includes an inboard surface 130$n$ that is configured to direct exhaust from one thruster 450 of the plurality of thrusters 450. For clarity, only some of the inboard surfaces 130$n$, in particular inboard surfaces 130$a$, 130$b$, and 130$c$ of three openings 146, are labeled in FIG. 4A. The inboard surface 130$n$ can include a section of the opening 146 that is closest to the longitudinal axis of the aerospike engine 120. A section of an inboard surface 130$d$ of an opening 146 is illustrated in dotted line in FIG. 4B.

Embodiments of the openings 146, and inboard surfaces 130$n$ of the openings 146, can have various shapes and include any suitable contour to direct exhaust from the thrusters 450 in accordance with the present disclosure. In the non-limiting embodiment illustrated in FIGS. 4A-4C, the openings 146 are scarfed nozzles 146 formed in the semi-spherical segment of the heat shield 140 of the aerospike engine 120. As illustrated in FIGS. 4A-4C, each scarfed nozzle 146 has an asymmetric shape relative to a longitudinal axis of the respective thruster 450, in contrast to the symmetric shape of the expansion nozzle 156 of the thruster 150 of the truncated aerospike engine 122 of FIGS. 2, 3A, and 3B. It will be understood that the openings 146 are not limited to scarfed nozzles and openings of other suitable shapes and contours can be implemented in accordance with the present disclosure. For example, the openings 146 can have an obtuse conical shape.

Embodiments of the openings 146 of the present disclosure can be distinct, separate structures that together are configured to mimic or emulate the contour of the continuous annular ramp or surface 130 of the truncated aerospike plug of engine 122 of FIG. 2. In implementations of the present disclosure, the inboard surface 130$n$ of each of the plurality of openings 146 can collectively form a contour that is similar to the contour of the single, continuous annular ramp or surface 130 of the truncated aerospike plug of engine 122 of FIG. 2. In the non-limiting implementation of FIGS. 4A-4C, the plurality of scarfed nozzles 146 are arranged radially around the longitudinal axis of the rocket body, and at least an inboard portion (such as an inboard surface) of each scarfed nozzle defines at least a portion of an aerospike contour. In combination, the plurality of portions of each scarfed nozzle can define the aerospike contour. A plurality of thruster modules inset into the plurality of scarfed nozzles 146 of the heat shield 140 are configured to eject exhaust along the inboard portions of the scarfed nozzles that together define the aerospike contour. Embodiments of reusable upper stage rockets using an aerospike engine 120 in accordance with the present disclosure can use the engine 120 to descend and land vertically upright, while also maintaining advantages associated with an exhaust profile that is similar to that of a truncated aerospike plug having a continuous annular ramp.

In non-limiting embodiments of the present disclosure, the heat shield 140 can include ribs 145. The ribs 145 may be located in between adjacent openings 146. The ribs 145 can form portions of the heat shield located between the openings 146. The ribs 145 may connect the central portion 142 and the outer portion 144 of the heat shield 140. The central portion 142, the ribs 145, and the outer portion 144 may form a semi-spherical-shaped heat shield that extends to the outer diameter of the rocket body 110.

Embodiments of the aerospike engine 120 according to the present disclosure may reduce inefficiencies in the performance due to the gap between adjacent thrust module nozzles as exhaust flows impinge on the portions 130n of the openings 146 and the neighboring flows impinge upon one another. In some embodiments, the thrusters 450 are positioned and sized to minimize the gap between flows and to have the flows leave the thruster 450 nozzle nearly parallel to one another and to the inboard surfaces 130n. The ribs 145 and the openings 146 can minimize or prevent adjacent thruster 450 flows from impinging on each other, while still providing benefits of an exhaust profile associated with a truncated aerospike plug having a continuous annular ramp. The contour of the inboard surfaces 130n can also reduce inefficiencies by smoothing the interface between the thruster 450 and the openings 146. The thrusters 450 may be oriented at a small angle relative to the longitudinal axis of the aerospike engine 120 to minimize losses due to the bend in the path of the exhaust from the powerpack to the inboard surfaces 130n. In some embodiments, the thrusters 450 are angled twenty degrees or less, fifteen degrees or less, ten degrees or less, or five degrees or less relative to the longitudinal axis. Additional advantages associated with embodiments of the aerospike engine 120 include, but are not limited to: 1) optimum nozzle expansion at any altitude from sea level to an altitude of very low atmospheric pressure; 2) stable nozzle flow at low throttle settings and sea level conditions, facilitating a smooth, controlled, powered vertical landing; 3) example configurations with a central plug can allow for incorporation of an entry heat shield into the engine; and 4) the aerospike engine design can allow for direct structural integration of the engine to the aft structure of the vehicle, eliminating or reducing the need for a thrust mount.

The heat shield 140 may include secondary fluid injectors 148 (illustrated in FIGS. 4A and 4B). The injectors 148 may be located within the central portion 142 of the heat shield 140. The injectors 148 may be arranged in an annular, for example circular, pattern. As shown, there is one annular pattern of injectors 148. There may be two, three, four or more annular patterns of the injectors 148. The annular configuration of secondary fluid injectors as illustrated is one possible configuration of fluid injectors. More or fewer injectors than illustrated can be suitably implemented. In some configurations, a fluid injector configuration may include a metal mesh surface through which the fluid is introduced across a majority or all of the surface in a transpiration cooling method. In some configurations, a fluid injector configuration may include a shingled surface such that the secondary flow exits in a tangential fashion from gaps between shingles where the inner circle overlaps the next circle outward.

The flow from the injectors 148 may join with the exhaust ejected from the thrusters 450. The two flows may join aft of the heat shield 140 in the open volume 164 inside the main exhaust plume. The purpose of the secondary flow during engine operation is to prevent formation of a low pressure in the open volumes due to aspiration by the main flow. Such a low-pressure zone can reduce the effective thrust and thus, reduce performance. When the engine is not running, such as during entry into the atmosphere, the secondary flow may cool the bottom of the engine, which is now functioning as an entry heat shield. The combined flow may result in a plume that has a shape similar to that of the plume obtained by the truncated aerospike plug of engine 122 of FIG. 2.

FIG. 4D illustrates one non-limiting example profile 400 of a thruster having a scarfed nozzle that may be implemented in a system such as described with reference to FIGS. 4A-4C. It is of note that a scarfed nozzle may be a nozzle configured to blend at least a portion of a thruster nozzle into an external surface, such as external surface 130. In some examples, a circular cross section nozzle might be scarfed where a rectangular cross section nozzle is not. As illustrated in FIG. 4D, a thruster 400 may include an inlet end 452 through which propellants coming from powerpack (s) are introduced into a combustion chamber 454 where combustion of propellants occurs. Hot gases resulting from the combustion process exit the combustion chamber through a converging nozzle or throat section 455 and continue through a nozzle 456 towards an exit 451. The throat section 455 may include converging surfaces that may be curved, such as illustrated in FIG. 4D, or straight. The converging surfaces may converge to a narrow section of the nozzle or throat before diverging. In contrast to a standard nozzle, walls of the nozzle 456 may be curved and extend outwards as opposed to trending towards straight walls to form a cylindrical shape if the nozzle were not scarfed or cut off at exit 451. As illustrated, in this non-limiting example scarfed nozzle, exit 451 may correspond to an exit plane that is non-orthogonal to the nozzle axis 453. An angle of the exit plane to the nozzle axis 453 may be greater than 10 degrees, such as 45 degrees or another angle between 10 and 60 degrees. However, other angles may also be possible. The angle of the exit plane to the nozzle axis 453 may correspond with a surface of the heat shield such that the exit 451 of the nozzle is flush with the surface of the heat shield. In some examples, the exit 451 may be curved or otherwise shaped to be flush with the surface of the heat shield in examples where the surface of the heat shield is not linear or flat in the area of the exit 451.

Figure 4E:
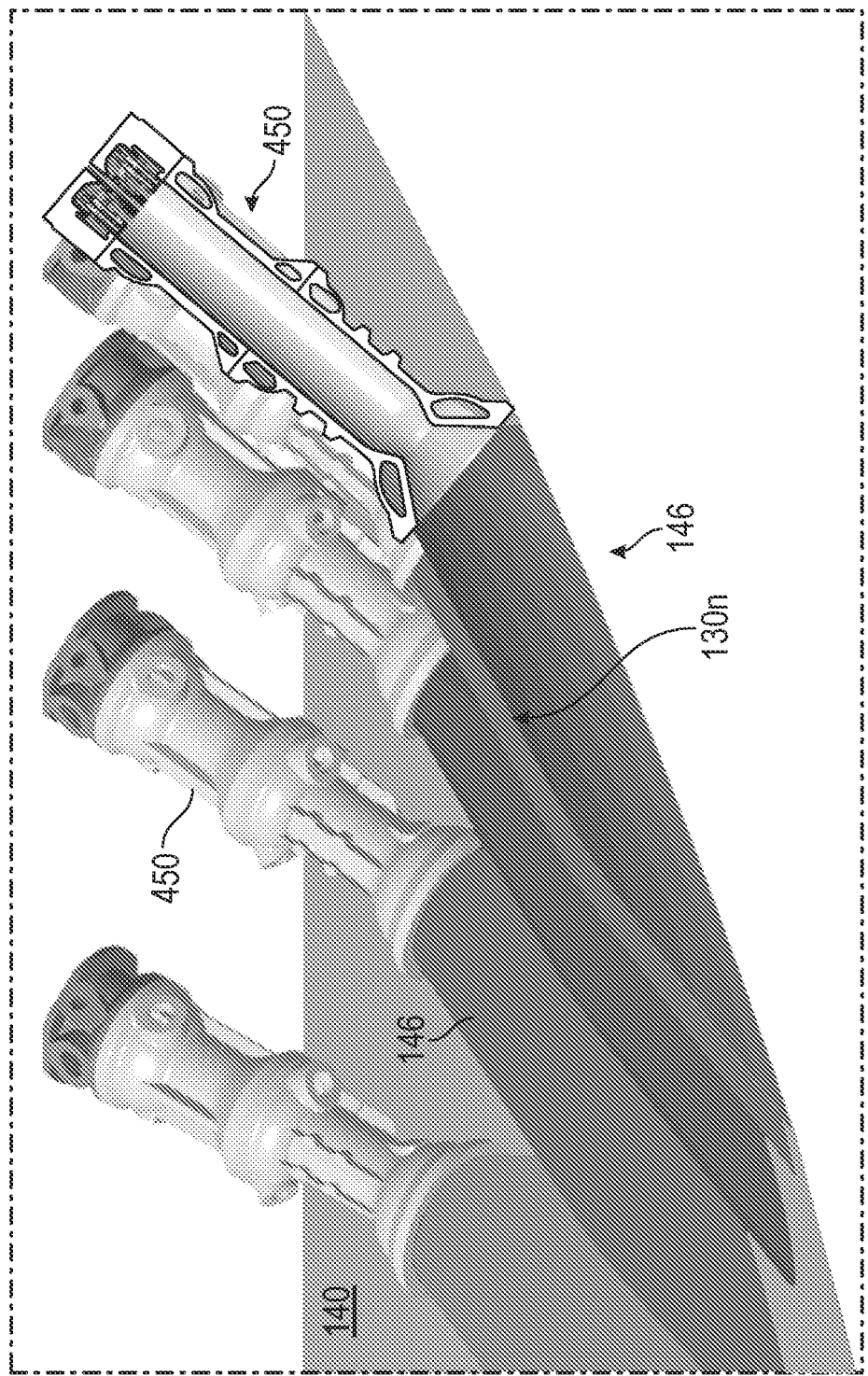
FIGS. 4E, 4F, 4G, and 4H illustrate additional partial perspective views of the aerospike engine illustrated in FIGS. 4A, 4B, and 4C.
Figure 4F:
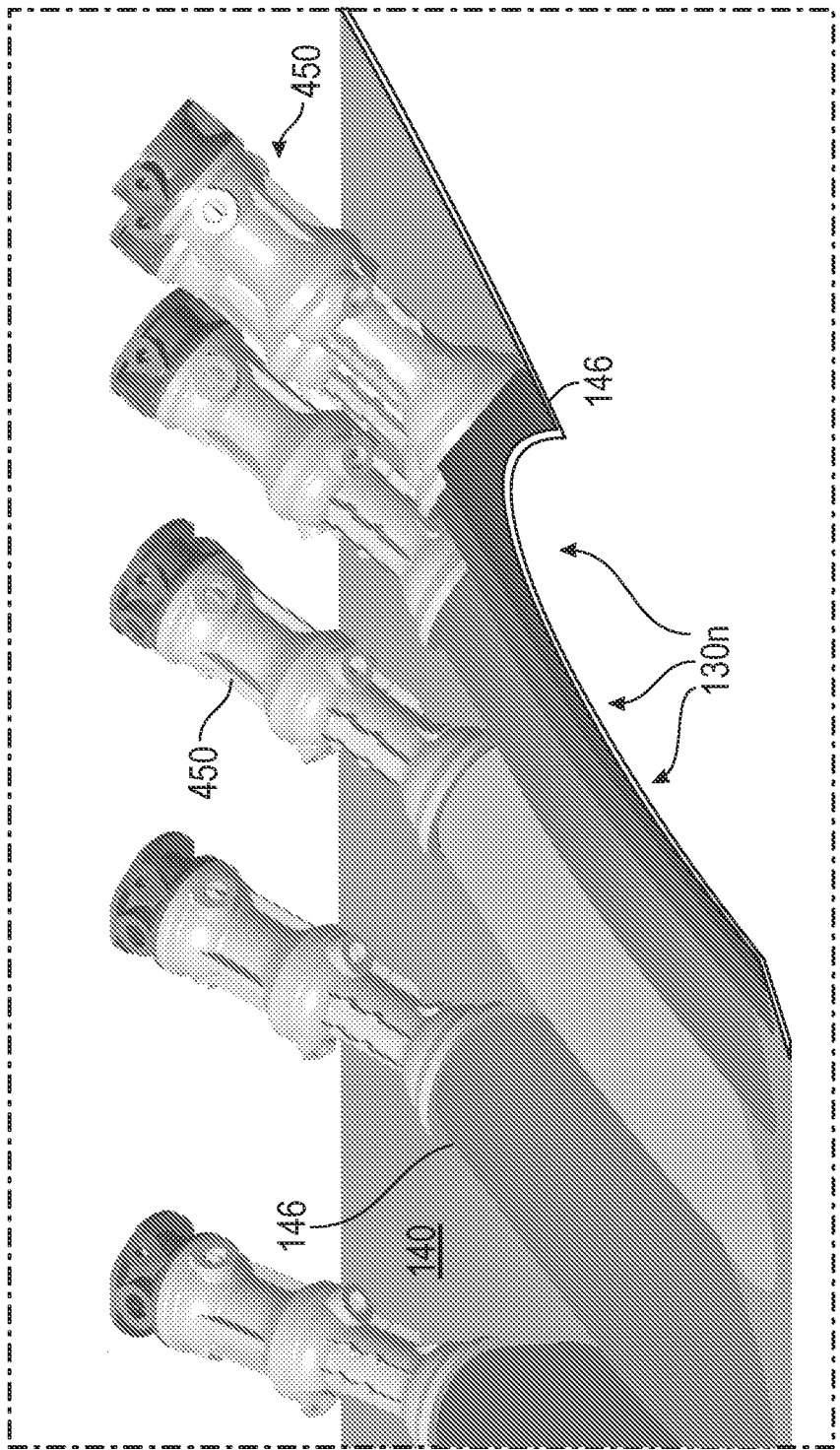
Figure 4G:
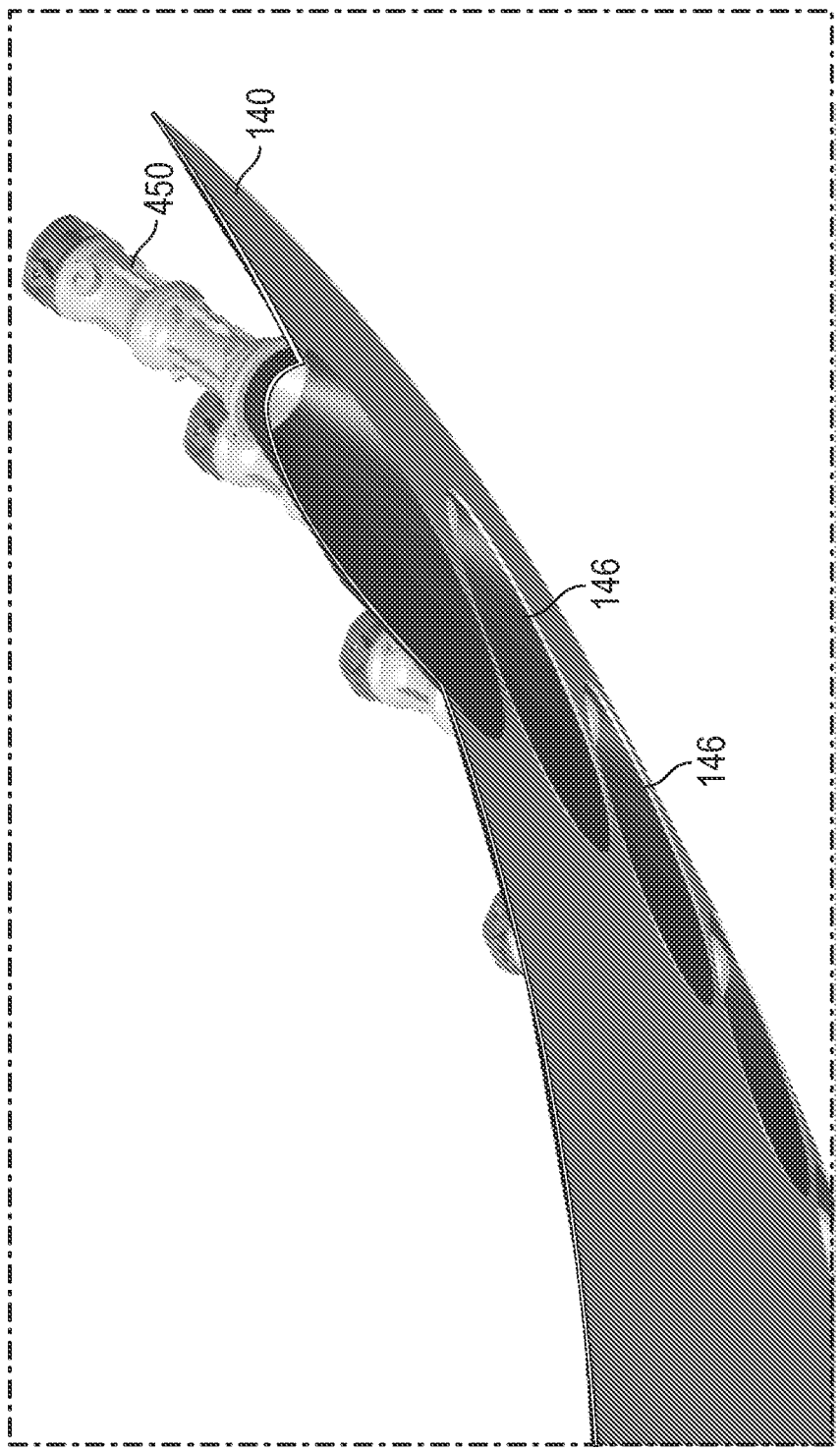
Figure 4H:
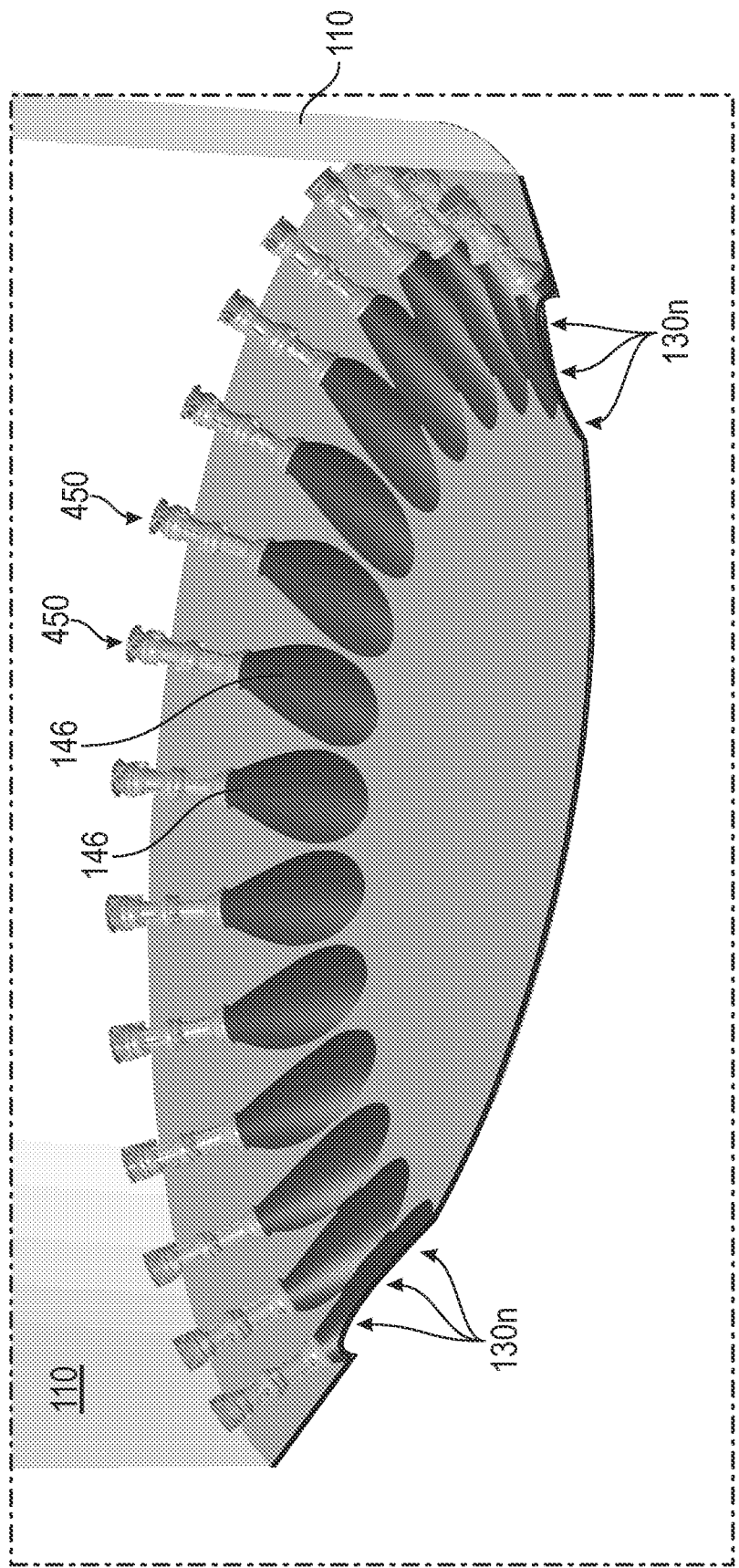

FIGS. 4E, 4F, 4G, and 4H illustrate additional partial perspective views of the aerospike engine illustrated in FIGS. 4A, 4B, and 4C. FIG. 4E illustrates a partial perspective view of an area inside the heat shield 140. A cross-sectional view of a scarfed nozzle and its associated thruster 450 are shown in the foreground of FIG. 4F. FIG. 4F illustrates another partial perspective view of an area inside the heat shield 140 (internal to the rocket body 110). A cross-sectional view of a scarfed nozzle 146 in the foreground is illustrated. In contrast to the cross-sectional view of FIG. 4E, the cross-section of FIG. 4G does not pass through the nozzle's associated thruster 450. FIG. 4G illustrates a partial perspective view of four scarfed nozzles 146 as viewed from an area outside the heat shield 140 (external to the rocket body 110). A cross-sectional view of a scarfed nozzle 146 in the foreground is also illustrated. FIG. 4H illustrates a partial perspective view of a cross-section of the rocket body 110, illustrating sixteen scarfed nozzles 146 as viewed from an area inside the heat shield (internal to the rocket body 110). Cross-sectional views of the leftmost and rightmost scarfed nozzles 146 are illustrated. It will be understood that launch vehicles described herein are not limited to the example heat shield having scarfed nozzles or openings 146 illustrated in FIGS. 4A-4C and 4E-4H, and heat shields with openings 146 having other suitable shapes and contours can be implemented in launch vehicles in accordance with the present disclosure.

It will also be understood that launch vehicles described herein are not limited to the example thrusters illustrated in FIGS. 4A-4C and 4E-4H, and thrusters having other suitable configurations can be implemented in launch vehicles in accordance with the present disclosure. For example, two configurations of thrust chamber are illustrated in the present disclosure by way of example and not limitation. FIGS. 3A and 3B illustrate a rectangular cross-section thruster that allows very compact integration of multiple thrust chambers. FIGS. 4A-4C and 4E-4H illustrate a more conventional circular cross-section thruster configuration that results in a less compact arrangement. Embodiments of an aerospike engine according to the present disclosure are described primarily with reference to the example thruster configuration illustrated in FIGS. 4A-4C and 4E-4H, but other thruster designs, such as but not limited to the design of FIGS. 3A and 3B, can be implemented according to the specific requirements of the launch vehicle.

Figure 5:
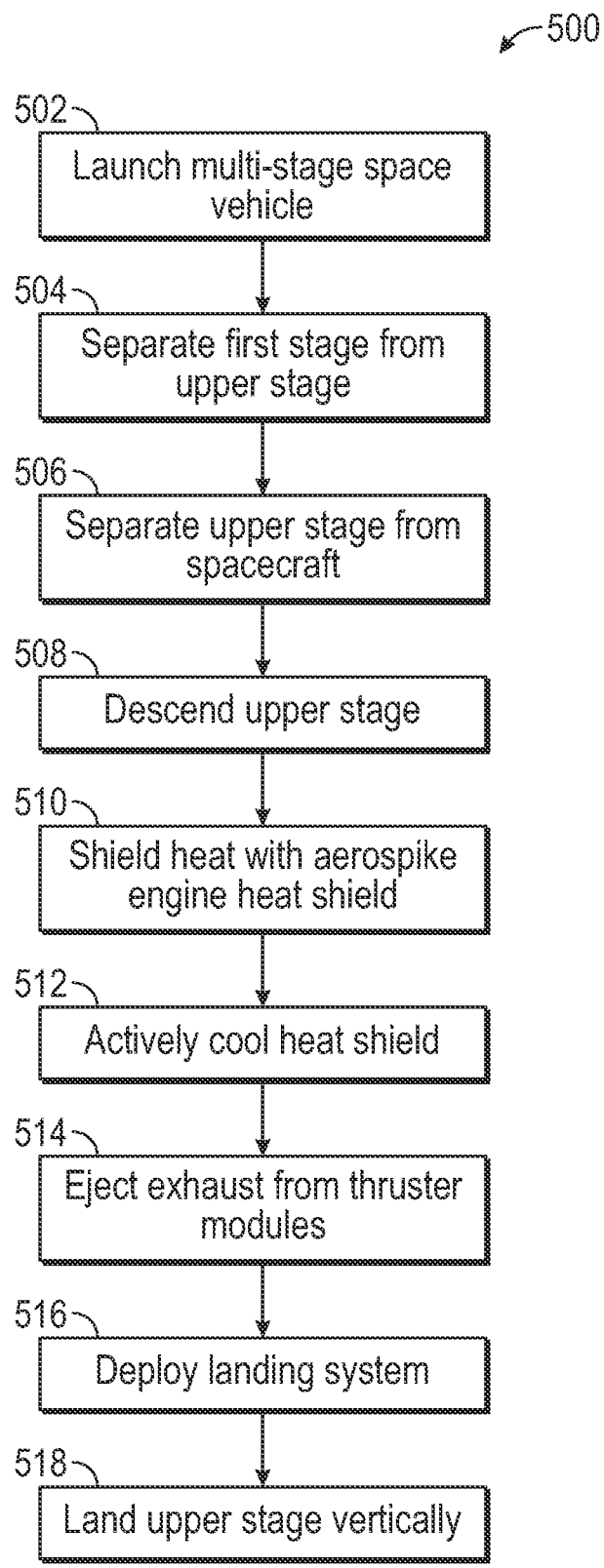
FIG. 5 is a flow chart showing an embodiment of a method of launching a multi-stage space vehicle and landing the upper stage back on earth for reuse according to the present disclosure.

FIG. 5 is a flow chart illustrating a non-limiting embodiment of a method 500 of launching a multi-stage space vehicle and landing the upper stage back on earth for reuse in accordance with the present disclosure. The upper stage can include the aerospike engine 120 described with reference to FIGS. 1B, 4A, 4B, 4C, 4E, 4F, 4G, and 4H to perform the method 500.

The method 500 begins with step 502 where a multi-stage space vehicle is launched from earth. The vehicle may include a lower stage, an upper stage, and a payload, such as a spacecraft or satellite. The vehicle may be launched from land or sea. The vehicle 10, the upper stage 100, and the aerospike engine 120 may be implemented.

The method 500 then continues to step 504 where the lower stage and upper stage separate. The lower stage may then fall to sea or be controllably landed for re-use. The method 500 then moves to step 506, where the upper stage engine is fired. The aerospike engine 120 may be used as described herein to provide forward thrust to carry the payload farther. The upper stage may carry the payload into orbit. The method 500 then continues to step 508 where the upper stage separates from the payload. The payload may then propel itself into orbit. The upper stage may separate from the propelling payload, reorient itself and fire its engines to deorbit and re-enter the atmosphere.

The method 500 then moves to step 510 where the upper stage descends. The upper stage may descend from above or below a space altitude, for example from above or below the Karman line at about 100 km (62 mi) above sea level. The upper stage may by controlled to descend aft-end down. Side thrusters of the upper stage may orient the body in step 508 so that the engine is facing in the direction of travel.

The method 500 then moves to step 512 where heat is prevented from burning up the upper stage by the heat shield. The heat shield may be oriented in the direction of travel so that heat is dissipated and does not affect the sides of the rocket body 110. The heat shield material may assist with dissipating heat.

The method 500 then moves to step 514 where the heat shield is actively cooled. Heat transfer fluid may flow through a cooling circuit. The fluid may flow through channels extending through the heat shield to remove heat. A transpiration cooling system may be used.

The steps 512 and 514 may overlap in time. The steps 512 and 514 may be performed simultaneously. The steps 512 and/or 514 may be performed for a relatively short duration of the reentry period of the upper stage. For example, the steps 512 and/or 514 may be performed for approximately 7-12 minutes or more or fewer minutes. The amount of time may be dependent on parameters of the system. In some examples, a longer duration may have a lower heat flux and/or temperature.

The method 500 then moves to step 516 where the thrusters are fired. As discussed above, the powerpacks provide propellants (fuel and oxidizer) to the thruster modules, which may include sidewalls forming a combustion chamber and nozzle. Combustion of the propellants occurs in the combustion chamber. Hot gases created in the combustion process exit the combustion chamber through converging or diverging nozzles to an exit. Exits of the thruster modules may be arranged in a plurality of openings separately formed in or embedded within a semi-spherical surface of the heat shield. The hot gases or exhaust from each thruster may flow along and be directed by an inboard surface of the respective opening, where the plurality of inboard surfaces collectively form an exhaust plume that resembles the plume associated with a truncated aerospike engine having a continuous annular ramp or surface. In step 516, secondary fluid may be emitted from secondary fluid injectors at the central portion of the heat shield to join with the exhaust and form a combined flow having a tapered or contoured shape. The flows from the thrusters and the secondary fluid injectors may join aft of the heat shield in the open volume inside the main exhaust plume. Step 516 may slow the upper stage for landing.

The method 500 then moves to step 518 where a landing system is deployed. The landing system may deploy legs or other suitable components for landing on a platform, or other non-platform structure. In some embodiments, the upper stage may not land directly on a platform. The upper stage may initially land using landing system components located forward of the aft end of the upper stage. Step 516 may be performed during step 518.

The method 500 then moves to step 520 where the upper stage lands vertically or substantially vertically. The upper stage may land vertically on a platform. The landing system may stabilize the upper stage upon touch down. Step 516 may be performed during step 520.

The flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A reusable upper stage for a multi-stage launch vehicle, the upper stage comprising:
    a rocket body extending from a forward end to an aft end and defining a longitudinal axis;
    a heat shield at the aft end of the rocket body, the heat shield configured to spherically cap the aft end of the rocket body and dissipate heat encountered upon reentry of the upper stage into the atmosphere, the heat shield comprising:
        a plurality of scarfed nozzles arranged radially around the longitudinal axis of the rocket body, wherein at least an inboard portion of each scarfed nozzle defines at least a portion of an aerospike contour; and
    an aerospike engine located at the aft end of the rocket body, the aerospike engine comprising:
        at least one powerpack configured to pump propellant at high pressure to a plurality of thruster modules,
        wherein at least a portion of each thruster module of the plurality of thruster modules is inset into a respective scarfed nozzle of the plurality of scarfed nozzles of the heat shield, the plurality of thruster modules configured to eject exhaust along at least the inboard portions of the scarfed nozzles defining portions of the aerospike contour.

2. The reusable upper stage of claim 1, further comprising secondary fluid injectors configured to eject fluid that joins with the exhaust ejected by the plurality of thruster modules.

3. The reusable upper stage of claim 2, wherein the secondary fluid injectors are arranged radially within the heat shield.

4. The reusable upper stage of claim 3, wherein the plurality of thruster modules are configured to eject exhaust and the secondary fluid injectors are configured to eject fluid to form an exhaust plume that is similar in geometry to the exhaust plume from a full-length plug nozzle.

5. The reusable upper stage of claim 1, wherein the heat shield is actively cooled.

6. The reusable upper stage of claim 1, wherein the heat shield comprises a cooling circuit configured to dissipate heat encountered during reentry of the upper stage.

7. A multi-stage launch vehicle having a reusable upper stage, the launch vehicle comprising:
    a lower stage configured to launch the vehicle from ground;
    an upper stage configured to separate from the lower stage, the upper stage comprising:
        a rocket body extending from a forward end to an aft end and defining a longitudinal axis;
        a heat shield at the aft end of the rocket body, the heat shield comprising a semi-spherical surface configured to cap the aft end of the rocket body and dissipate heat encountered upon reentry of the upper stage into the atmosphere, the heat shield comprising:
  a plurality of scarfed nozzles embedded radially around the semi-spherical surface of the heat shield, wherein inboard surfaces of the plurality of scarfed nozzles collectively define an aerospike contour; and
an aerospike engine located at the aft end of the rocket body, the aerospike engine comprising:
  at least one powerpack configured to pump propellant at high pressure to a plurality of thruster modules,
  wherein each thruster module of the plurality of thruster modules is inset into a respective scarfed nozzle of the plurality of scarfed nozzles of the heat shield, the plurality of thruster modules configured to eject exhaust along the aerospike contour collectively defined by inboard surfaces of the plurality of scarfed nozzles.

8. The multi-stage launch vehicle of claim 7, wherein the upper stage further comprises secondary fluid injectors configured to eject fluid that joins with the exhaust ejected by the plurality of thruster modules.

9. The multi-stage launch vehicle of claim 8, wherein the secondary fluid injectors are arranged radially within the heat shield.

10. The multi-stage launch vehicle of claim 9, wherein the plurality of thruster modules are configured to eject exhaust and the secondary fluid injectors are configured to eject fluid to form an exhaust plume that is similar in geometry to the exhaust plume from a full-length plug nozzle.

11. The multi-stage launch vehicle of claim 7, wherein the heat shield is actively cooled.

12. The multi-stage launch vehicle of claim 7, wherein the heat shield comprises a cooling circuit configured to dissipate heat encountered during reentry of the upper stage.

13. A method of using an upper stage rocket, the method comprising:
  launching a multi-stage space vehicle from earth, the space vehicle comprising:
    a lower stage configured to lift the space vehicle off ground; and
    a reusable upper stage configured to separate from the lower stage and to land vertically, the upper stage comprising:
      a rocket body extending from a forward end to an aft end and defining a longitudinal axis;
      a heat shield at the aft end of the rocket body, the heat shield comprising a semi-spherical surface configured to cap the aft end of the rocket body and dissipate heat encountered upon reentry of the upper stage into the atmosphere, the heat shield comprising:
        a plurality of scarfed nozzles embedded radially around the semi-spherical surface of the heat shield, wherein inboard surfaces of the plurality of scarfed nozzles collectively define an aerospike contour; and
      an aerospike engine located at the aft end of the rocket body, the aerospike engine comprising:
        at least one powerpack configured to pump propellant at high pressure to a plurality of thruster modules,
        wherein each thruster module of the plurality of thruster modules is inset into a respective scarfed nozzle of the plurality of scarfed nozzles of the heat shield, the plurality of thruster modules configured to eject exhaust along the aerospike contour collectively defined by inboard surfaces of the plurality of scarfed nozzles.

14. The method of claim 13, further comprising:
descending the upper stage in an aft-end down orientation after separation from the lower stage; and
ejecting the exhaust from the plurality of thruster modules to slow descent of the upper stage.

15. The method of claim 14, further comprising actively cooling the heat shield during descent of the upper stage.

16. The method of claim 14, further comprising landing the upper stage vertically.

17. The reusable upper stage of claim 1, wherein the heat shield comprises a semi-spherical surface, and wherein the plurality of scarfed nozzles are embedded radially around the semi-spherical surface of the heat shield.

18. The reusable upper stage of claim 1, wherein the heat shield comprises a surface configured to cap the aft end of the rocket body, and wherein the plurality of scarfed nozzles are embedded around the surface of the heat shield.

19. The reusable upper stage of claim 18, wherein inboard surfaces of the plurality of scarfed nozzles collectively define the aerospike contour, and wherein the plurality of thruster modules are configured to eject exhaust along the aerospike contour.

* * * * *